US012238576B2

(12) United States Patent
Llatser Marti et al.

(10) Patent No.: US 12,238,576 B2
(45) Date of Patent: Feb. 25, 2025

(54) METHOD FOR TRANSFERRING A MESSAGE IN A COMMUNICATIONS NETWORK FOR COMMUNICATION BETWEEN A ROAD USER AND AT LEAST ONE FURTHER ROAD USER

(71) Applicant: Robert Bosch GmbH, Stuttgart (DE)

(72) Inventors: Ignacio Llatser Marti, Hildesheim (DE); Florian Alexander Schiegg, Hildesheim (DE); Frank Hofmann, Hildesheim (DE); Maxim Dolgov, Renningen (DE); Florian Wildschuette, Hildesheim (DE); Hendrik Fuchs, Hildesheim (DE); Thomas Michalke, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 348 days.

(21) Appl. No.: 17/773,555

(22) PCT Filed: Sep. 25, 2020

(86) PCT No.: PCT/EP2020/076923
§ 371 (c)(1),
(2) Date: Apr. 29, 2022

(87) PCT Pub. No.: WO2021/089237
PCT Pub. Date: May 14, 2021

(65) Prior Publication Data
US 2022/0386169 A1 Dec. 1, 2022

(30) Foreign Application Priority Data
Nov. 4, 2019 (DE) .................... 10 2019 216 916.3

(51) Int. Cl.
H04W 28/06 (2009.01)
H04W 4/40 (2018.01)

(52) U.S. Cl.
CPC ............. *H04W 28/06* (2013.01); *H04W 4/40* (2018.02)

(58) Field of Classification Search
CPC .... H04W 4/40; H04W 28/0289; H04W 28/06
See application file for complete search history.

(56) References Cited

U.S. PATENT DOCUMENTS

2016/0197825 A1* 7/2016 Grotendorst .......... G08G 1/162
370/392

FOREIGN PATENT DOCUMENTS

JP 2001309420 A 11/2001
JP 2012533219 A 12/2012
(Continued)

OTHER PUBLICATIONS

International Search Report for PCT/EP2020/076923, Issued Nov. 17, 2020.
(Continued)

*Primary Examiner* — Brian P Cox
(74) *Attorney, Agent, or Firm* — NORTON ROSE FULBRIGHT US LLP; Gerard A. Messina

(57) ABSTRACT

A method for transferring a message in a communications network for communication between a road user and at least one further road user. The road user and the further road user each include an evaluation unit for transferring messages via the communications network. The method includes: receiving a first message in the evaluation unit, the first message including message segments, each including a priority value; determining an instantaneous capacity utilization of the communications network; filtering message segments to be transferred out of the first message, based on the priority (Continued)

values and the instantaneous capacity utilization of the communications network; and generating a second message including the message segments to be transferred, and sending the second message via the communications network.

11 Claims, 3 Drawing Sheets

(56) References Cited

FOREIGN PATENT DOCUMENTS

| WO | 2017022475 A1 | 2/2017 | |
|---|---|---|---|
| WO | WO-2018182591 A1 * | 10/2018 | ............ H04W 4/40 |
| WO | WO-2019160176 A1 * | 8/2019 | |

OTHER PUBLICATIONS

Hobert et al., "Enhancements of V2X Communication in Support of Cooperative Autonomous Driving," IEEE Communications Magazine, vol. 53, No. 12, 2015, pp. 64-70. <https://www.researchgate.net/publication/291019002_Enhancements_of_V2X_Communication_in_Support_of_Cooperative_Autonomous_Driving/link/5839220508aef00f3bfa3e8e/download> Downloaded Apr. 26, 2022.

Günther et al., "Collective Perception and Decentralized Congestion Control in Vehicular Ad-Hoc Networks," IEEE Vehicular Networking Conference (VNC), 2016, pp. 1-185. <https://publikationsserver.tu-braunschweig.de/servlets/MCRFileNodeServlet/dbbs_derivate_00044303/Diss_Guenther_HendrikJoern.pdf> Downloaded Apr. 26, 2022.

Sepulcre et al., "Congestion and Awareness Control in Cooperative Vehicular Systems," in Proceedings of the IEEE, vol. 99, No. 7, 2011, pp. 1-18. <https://citeseerx.ist.psu.edu/viewdoc/download?doi=10.1.1.712.49&rep=rep1&type=pdf> Downloaded Apr. 26, 2022.

Aygun et al., "ECPR: Environment- and Context-Aware Combined Power and Rate Distributed Congestion Control for Vehicular Communications," Computer Communications, 2016, pp. 1-37. <https://arxiv.org/pdf/1502.00054.pdf> Downloaded Apr. 26, 2022.

Math et al., "Data Rate Based Congestion Control in V2V Communication for Traffic Safety Applications," 2015 IEEE Symposium on Communications and Vehicular Technology in the Benelux (SCVT), 2015, pp. 1-6.

ETSI TS 102 687 V1.2.1, "Intelligent Transport Systems (ITS); Decentralized Congestion Control Mechanisms for Intelligent Transport Systems operating in the 5 GHz range; Access layer part," 2018, pp. 1-14.

ETSI TS 103 175 V1.1.1, "Intelligent Transport Systems (ITS); Cross Layer DCC Management Entity for operation in the Its G5A and Its G5B medium," 2015, pp. 1-36.

ETSI TR 101 612 V1.1.1, "Intelligent Transport Systems (ITS); Cross Layer DCC Management Entity for operation in the Its G5A and Its G5B medium; Report on Cross layer DCC algorithms and performance evaluation," 2014, pp. 1-57.

* cited by examiner

METHOD FOR TRANSFERRING A MESSAGE IN A COMMUNICATIONS NETWORK FOR COMMUNICATION BETWEEN A ROAD USER AND AT LEAST ONE FURTHER ROAD USER

FIELD

The present invention relates to a method, an evaluation unit, a computer program and a computer-readable medium for transferring a message in a communications network for communication between a road user and at least one further road user.

BACKGROUND INFORMATION

Vehicle-to-infrastructure communication (V2I) and vehicle-to-vehicle communication (V2V), also referred to collectively as vehicle-to-X communication (V2X), make it possible for vehicles and so-called roadside units (RSUs) to communicate with each other wirelessly. For example, vehicle dynamics data may be exchanged, such as position or velocity, or pieces of information about surroundings of a vehicle.

An application of V2X communication in connection with driver assistance systems for automated driving is considered particularly promising. Technologies such as collective perception, i.e., a sharing of pieces of information about objects, which were "recognized by an on-board sensor system of a vehicle, with adjacent vehicles, and a coordination of vehicle maneuvers based on an exchange of anticipated vehicle trajectories, may increase the safety level, driving comfort and traffic efficiency; in this regard, also see: Laurens Hobert et al., "Enhancements of V2X Communication in Support of Cooperative Autonomous Driving," IEEE Communications Magazine 53(12), pp. 64-70, 2015.

Cooperative driving functions require a transfer of new types of V2X messages, such as the Collective Perception Message (CPM) and the Maneuver Coordination Message (MCM), which are currently being proposed for standardization by the Commission of the European Telecommunications Standards Institute (ETSI). These messages typically contain obligatory fields, which must be contained in each message, for example a header, and a number of optional fields, which may be added to a message according to certain rules. This relates to, for example, recognized objects in a CPM or vehicle trajectories in an MCM.

A transfer of V2X messages for cooperative driving may result in a higher load on a V2X radio channel. If the ITS G5 technology is used, which was standardized in the EU for V2X communication, a channel overload may result in a reduced communication performance, i.e., in a higher packet error rate and higher latencies.

To prevent an overload of the V2X radio channel, a so-called DCC protocol (DCC=Distributed Congestion Control) may be used to transfer messages. The goal of the DCC protocol is to optimize the network stability, the throughput rate and the assignment of resources to participating network stations.

SUMMARY

A method, an evaluation unit, a computer program and a computer-readable medium for transferring a message in a communications network for communication between a road user and at least one further road user are provided in accordance with the present invention. Advantageous refinements on and improvements of the approach presented here result from the disclosure herein.

Specific embodiments of the present invention advantageously make it possible to transfer messages in a V2X communications network, taking into account their particular relevance for participating vehicles or road users and taking into account an instantaneous network utilization. Due to the fact that a transfer is controlled as a function of a message content, it may be prevented, for example, that high-priority messages, for example a warning of a potentially imminent collision with a pedestrian, are discarded, while low-priority messages are transferred, for example a position and velocity of a vehicle driving on an expressway in the opposite direction. In other words, more higher-priority messages may be transferred in the case of higher network utilization in that fewer low-priority messages are transferred at the same time.

A first aspect of the present invention relates to a method for transferring a message in a communications network for communication between a road user and at least one further road user. The road user and the further road user each have an evaluation unit for transferring messages via the communications network. In accordance with an example embodiment of the present invention, the method includes the following steps, which may be carried out, in particular, in the indicated order: receiving a first message in the evaluation unit, the first message including message segments each having a priority value; determining an instantaneous capacity utilization of the communications network; filtering message segments to be transferred out of the first message, based on the priority values and the instantaneous capacity utilization of the communications network; and generating a second message including the message segments to be transferred, and sending the second message via the communications network.

A road user may be understood to be, for example, a motor vehicle, such as a passenger car, truck, bus or a motorcycle, an element of a traffic infrastructure, also referred to as a roadside unit, a bicycle, a kick scooter or a pedestrian.

A communications network may be understood to be a network for traffic networking, for example from vehicle to vehicle (V2V or car2car), from vehicle to road (V2R), from vehicle to infrastructure (V2I), from vehicle to network (V2N) or from vehicle to persons (V2P). For example, messages between users of the communications network may be transferred via a wireless communication link, such as a WLAN, Bluetooth or mobile radio link.

It is possible that the road users each include a sensor system for detecting their surroundings. The sensor system may be, for example, a camera, a radar sensor or a LIDAR sensor. The evaluation unit may be designed to recognize objects, based on sensor data generated by the sensor system, and/or to control the relevant road user, for example a vehicle, according to the recognized objects, i.e., to steer, brake and/or accelerate it by activating a corresponding actuator system. For example, the evaluation unit may be designed to control the road user, based on messages provided by other road users and received via the communications network.

A recognized object may also be, for example, a trajectory of an adjacent road user or a piece of maneuver information, based on at least one possible trajectory of the road user and/or at least one possible trajectory of at least one adjacent road user.

For example, a priority value may be assigned to a recognized object, which indicates a relevance of the recognized object for the relevant road user and/or further road users. This assignment may take place, for example, with the aid of a surroundings model, which stores objects in the surroundings as object models and updates them continuously, based on the sensor data. For example, the surroundings model may determine the relevance of the object, based on a position, location, velocity, trajectory or object class of the object and quantify this relevance by calculating a corresponding priority value.

A message to be transferred in the communications network may be viewed as a V2X message for cooperative driving, for example a CPM or an MCM. A message of this type may contain not only a header but also one or multiple message segments. In contrast to the header, the message segments may be optional. For example, it is possible that each message segment describes a recognized object, for example its position, location, velocity, size or object class, and is marked by the priority value of the recognized object. The individual message segments of a message may differ from each other in terms of their priority value. The message may furthermore contain pieces of information about anticipated trajectories, a steering angle, a position, a direction or a velocity of the road user. In addition, the field of vision or the range of the sensor system may be described in the message.

A second aspect of the present invention relates to an evaluation unit, which is designed to carry out the method as described above and below. Features of the method, as described above and below, may also be features of the evaluation unit.

Further aspects of the present invention relate to a computer program, which, when executed on a processor, carries out the method, as described above and below, as well as a computer-readable medium, on which a computer program of this type is stored.

The computer-readable medium may be, for example, a hard disk, a USB memory device, a RAM, ROM, EPROM or a flash memory. The computer-readable medium may also be a data communications network, which permits a download of a program code, such as the Internet. The computer-readable memory may be transitory or non-transitory.

Features of the method, as described above and below, may also be features of the computer program and/or the computer-readable memory.

Ideas relating to specific embodiments of the present invention may be viewed, among other things, as being based on the considerations and findings described below.

A DCC protocol, as presently used for V2X communication, primarily controls a message transfer rate i.e., a transfer of messages based on a measured channel busy ratio; in this regard, also see: ETSI TS 102 687 V1.2.1, Intelligent Transport Systems (ITS); Decentralized Congestion Control Mechanisms for Intelligent Transport Systems Operating in the 5 GHz Range; Access Layer Part. ETSI TS 103 175 V1.1.1, Intelligent Transport Systems (ITS); Cross Layer DCC Management Entity for Operation in the ITS G5A and ITS G5B Medium. ETSI TR 101 612 V1.1.1, Intelligent Transport Systems (ITS); Cross Layer DCC Management Entity for Operation in the ITS G5A and ITS G5B Medium; Report on Cross layer DCC Algorithms and Performance Evaluation.

The main component of this DCC protocol is a gatekeeper, which is situated between an access layer and a network layer, which places the messages to be transferred into queues according to their priority and limits the message transfer rate as a function of a measured channel busy ratio. The message transfer rate is limited regardless of a particular type and a particular content of the messages.

In contrast to the instantaneous DCC algorithms, which view each V2X message as a black box, according to the approach described here, a list of message segments including transfer priorities is generated. This list may be provided, for example, by a collective perception service or a maneuver coordination service. The message segments correspond, for example, to the optional fields of a message mentioned in the following. For example, it may be decided, with the aid of a DCC protocol, which of the message segments in a message are to be transferred and which are not.

A transfer priority of a message segment may be calculated, for example, by an application, based on a functional use of the message segment, and provided as input for a DCC protocol.

Examples of functionally useful message segments are recognized objects having high dynamics or preferred vehicle trajectories.

It is possible, for example, that the DCC protocol selects which of the message segments (if present) are to be transferred, based on the list of message segments and a channel condition, and returns the result to the application. The application then creates a V2X message, based on the message segments selected for transfer, and forwards the V2X message to a network layer.

An efficient channel use is difficult to achieve with the aid of present DCC algorithms, if V2X messages necessary for cooperative driving are transferred on the same channel; in this regard, also see: Hendrik-Jorn Günther, et al. "Collective Perception and Decentralized Congestion Control in Vehicular Ad-Hoc Networks," IEEE Vehicular Networking Conference (VNC) 2016.

For example, present DCC protocols do not take into account the contents of the messages. As a result, they are not able to distinguish between important and less important messages or transfer certain messages as a priority over other messages. With regard to present DCC protocols, also see: M. Sepulcre, J. Mittag, P. Santi, H. Hartenstein and J. Gozalvez, "Congestion and Awareness Control in Cooperative Vehicular Systems," in Proceedings of the IEEE, Vol. 99, No. 7, pp. 1260-1279, July 2011. Bengi Aygun, Mate Boban, Alexander M. Wyglinski, "ECPR: Environment- and Context-Aware Combined Power and Rate Distributed Congestion Control for Vehicular Communications," Computer Communications, Vol. 93, pp. 3-16, 2016. C. B. Math, A. Ozgur, S. H. de Groot and H. Li, "Data Rate-Based Congestion Control in V2V Communication for Traffic Safety Applications," 2015 IEEE Symposium on Communications and Vehicular Technology in the Benelux (SCVT), Luxembourg City, 2015, pp. 1-6.

The approach described here in accordance with the present invention, however, facilitates a priority-based selection of message segments to be transferred, for the purpose of reaching a good compromise between functional use and channel load. Message segments having a high priority are selected with preference for each message. At the same time, it is possible to ensure that the radio channel load remains below a certain threshold value.

According to one specific embodiment of the present invention, the method may further include: determining a maximum message size of a message to be transferred as a function of the instantaneous capacity utilization of the communications network, and determining a priority threshold value as a function of the instantaneous capacity utilization of the communications network and/or based on priority values of message segments last transferred; filtering the message segments to be transferred out of the first massage, based on the maximum message size and the priority threshold value. In other words, the priority threshold value may vary from message to message and be recalculated for each message to be transferred, based on one or multiple preceding messages. The priority threshold value may be continuously adapted thereby to changing situations in the surroundings of the road user as well as to temporal fluctuations of the network capacity utilization.

According to one specific embodiment of the present invention, a filter list for message segments to be filtered may be created. The priority values of the message segments may each be compared with the priority threshold value. The filter list may be shortened by removing message segments whose priority value is below the priority threshold value. The message segments to be transferred may then be selected from the shortened filter list, taking into account the maximum message size. As a result, the filtering out may take place in two stages, by means of which the efficiency of the method may be increased.

According to one specific embodiment of the present invention, the method also includes the following steps, which may be preferably carried out in the indicated order: selecting a message segment including the highest priority value from the shortened filter list; ascertaining a message segment size of the selected message segment; comparing the message segment size with the maximum message size; when the message segment size is smaller than the maximum message size: adding the selected message segment to a transfer list of message segments to be transferred; removing the selected message segment from the shortened filter list; reducing the maximum message size by the message segment size. The steps of selecting, ascertaining, comparing, adding, removing and reducing may be repeated cyclically until the message segment size is smaller than or equal to the maximum message size and/or all message segments have been removed from the shortened filter list. Only then do the generation of the second message from the transfer list and the transfer of the second message via the communications network take place. If the updating of the transfer list is interrupted, for example because the size of the added message segments has reached the maximum message size, the message including the message segments added up to this point in time may be generated. This makes it possible to ensure that the message always contains the message segments having the highest priority even in the case of a limited message size.

According to one specific embodiment of the present invention, the method may additionally include the following step: checking whether the transfer list contains at least one message segment. If it does, the generation of the second message with the transfer list and the transfer of the second message via the communications network may take place. For example, the sending of messages without message segments may be avoided thereby.

According to one specific embodiment of the present invention, the priority threshold value may be calculated from a channel busy ratio (CBR). The priority threshold value may increase and/or decrease along with the channel busy ratio. A channel busy ratio may generally be understood to be a ratio of a time interval, in which a radio channel assigned to the communications network is used, to a measuring interval, in which the channel busy ratio is measured. For example, the priority threshold value may be proportional to the channel busy ratio. Additionally or alternatively, at least one statistical characteristic may be calculated from the priority values of message segments last transferred. The priority threshold value may then be calculated from the statistical characteristic. A statistical characteristic of this type may be, for example, an arithmetic mean value or a median. It is possible that the priority threshold value increases and/or decreases along with the statistical characteristic. For example, the priority threshold value may be proportional to the statistical characteristic. As a result, random fluctuations may be compensated for during the calculation of the priority threshold value.

According to one specific embodiment of the present invention, the instantaneous capacity utilization of the communications network may be calculated as an instantaneously available data transfer rate ($R_a$) of a radio channel assigned to the communications network from a channel busy ratio (CBR) and a data transfer rate (R) of the radio channel: $R_a=(1-CBR) \cdot R$. A data transfer rate may be understood to be a theoretical bandwidth or a bandwidth of the radio channel necessary for a transfer. The necessary bandwidth may be, for example, approximately two-thirds of the theoretical bandwidth. The capacity utilization of the communications network may thus be very easily ascertained.

According to one specific embodiment of the present invention, the maximum message size may be calculated to: $M_{max}=R_a \cdot T$. T is understood to be a time since the last transfer of a message via the radio channel. The maximum message size may be determined as a function of a transfer frequency. For example, the message size selected may be greater, the lower the transfer frequency, and vice versa.

BRIEF DESCRIPTION OF THE DRAWINGS

Specific embodiments of the present invention are described below with reference to the figures, neither the figures nor the description are to be interpreted as limiting the present invention.

The figures are only schematic and not true to scale. The same reference numerals designate the same or functionally equivalent features in the figures.

DETAILED DESCRIPTION OF EXAMPLE EMBODIMENTS

Figure 1:
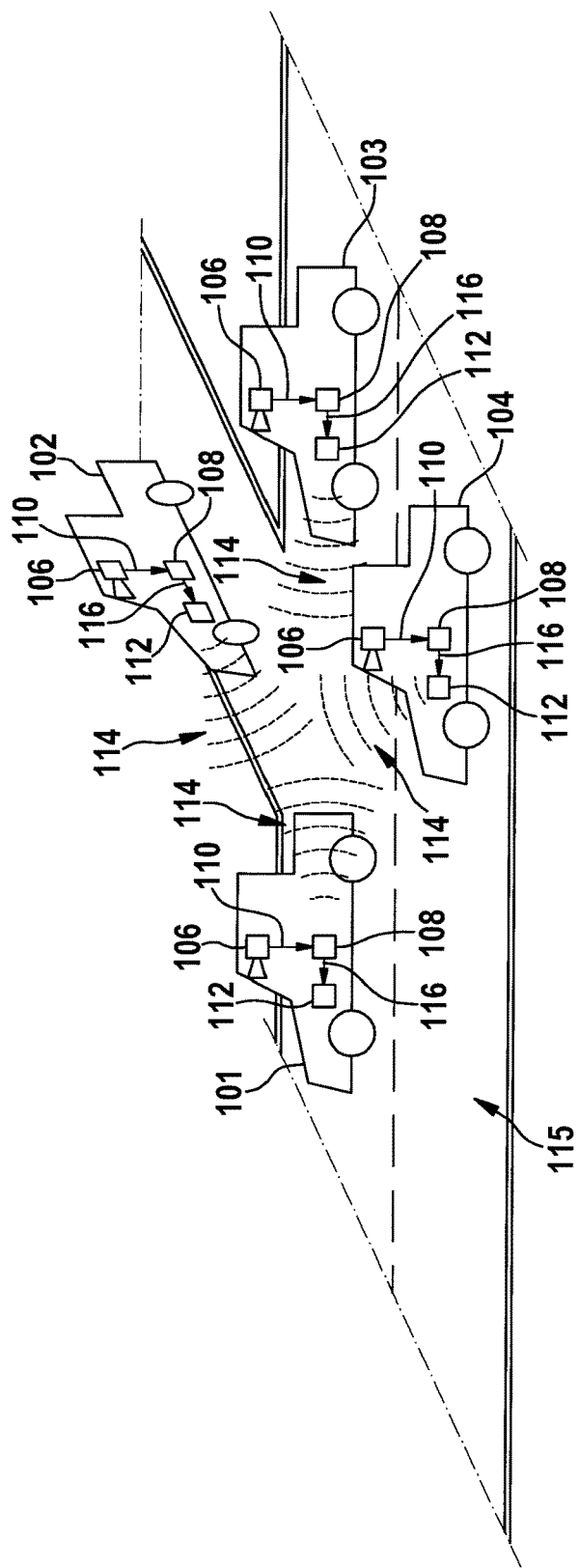
FIG. 1 schematically shows a traffic scenario including networked vehicles, each being equipped with an evaluation unit according to one exemplary embodiment of the present invention.

FIG. 1 shows an example of four vehicles 101, 102, 103, 104, each of which is equipped with a sensor system 106 for detecting surroundings, an evaluation unit 108 for evaluating sensor data 110 generated by sensor system 106, and an actuator system 112. Evaluation unit 108 is furthermore configured to send and/or receive a message 114 via a wireless V2X communications network, in which the four vehicles 101, 102, 103, 104 are networked with each other, based on sensor data 110. A received message 114 may be evaluated by evaluation unit 108, for example to activate actuator system 112. It is thus possible, for example, to coordinate individual driving maneuvers of vehicles 101, 102, 103, 104 in an automated manner, which may also be referred to as cooperative driving.

In FIG. 1, the three vehicles 101, 103, 104 drive on an expressway 115, while vehicle 102 is in the process of entering expressway 115.

For example, sensor system 106 is implemented as a camera. However, sensor system 106 may also include multiple sensor units of different types. For example, sensor system 106 may include, for example, at least one radar, LIDAR or ultrasonic sensor or laser scanner in addition or as an alternative to the camera.

Actuator system 112 may include, for example, a steering or brake actuator or an actuator for controlling the engine. Evaluation unit 108 may be designed to generate a control signal 116 for activating actuator system 112, based on sensor data 110 and/or message 114, for the purpose of controlling, i.e., steering, braking, accelerating the relevant vehicle in an automated manner, or to navigate it according to a predefined route in a digital map, for example, taking into account anticipated trajectories of the other vehicles in each case.

Evaluation unit 108 is configured, in particular, to extract objects in the surroundings from sensor data 110, for example, adjacent vehicles or their possible trajectories. Evaluation unit 108 of vehicle 103 thus recognizes, for example, the three vehicles 101, 102, 104. Upon recognition, evaluation unit 108 assigns a priority value to each of the recognized objects, which quantifies a relevance of the recognized object for vehicle 103. In this example, for example, the two vehicles 101, 104 receive a lower priority value than entering vehicle 102, whose trajectory is expected to intersect with a trajectory of vehicle 103.

In addition, evaluation unit 108 ascertains an instantaneous channel capacity utilization of a radio channel, via which vehicles 101, 102, 103, 104 communicate with each other. Based on the instantaneous channel capacity utilization and the particular priority values, evaluation unit 108 now selects from among the recognized objects the ones which are particularly relevant, in this case, for example, recognized vehicle 102, and generates and sends a message 114 including a piece of relevant information, for example, about the position, velocity, trajectory of recognized vehicle 102. Less relevant objects are excluded from message 114, to avoid unnecessarily loading the radio channel. Message 114 may be received by other vehicles, for example by vehicles 101, 104.

The individual steps of a priority-based message generation of this type, taking into account a channel capacity utilization, are described in detail below, based on the example of evaluation unit 108 of vehicle 103. However, the description may also apply in the same or similar way to evaluation units 108 of other vehicles 101, 102, 104.

Figure 2:
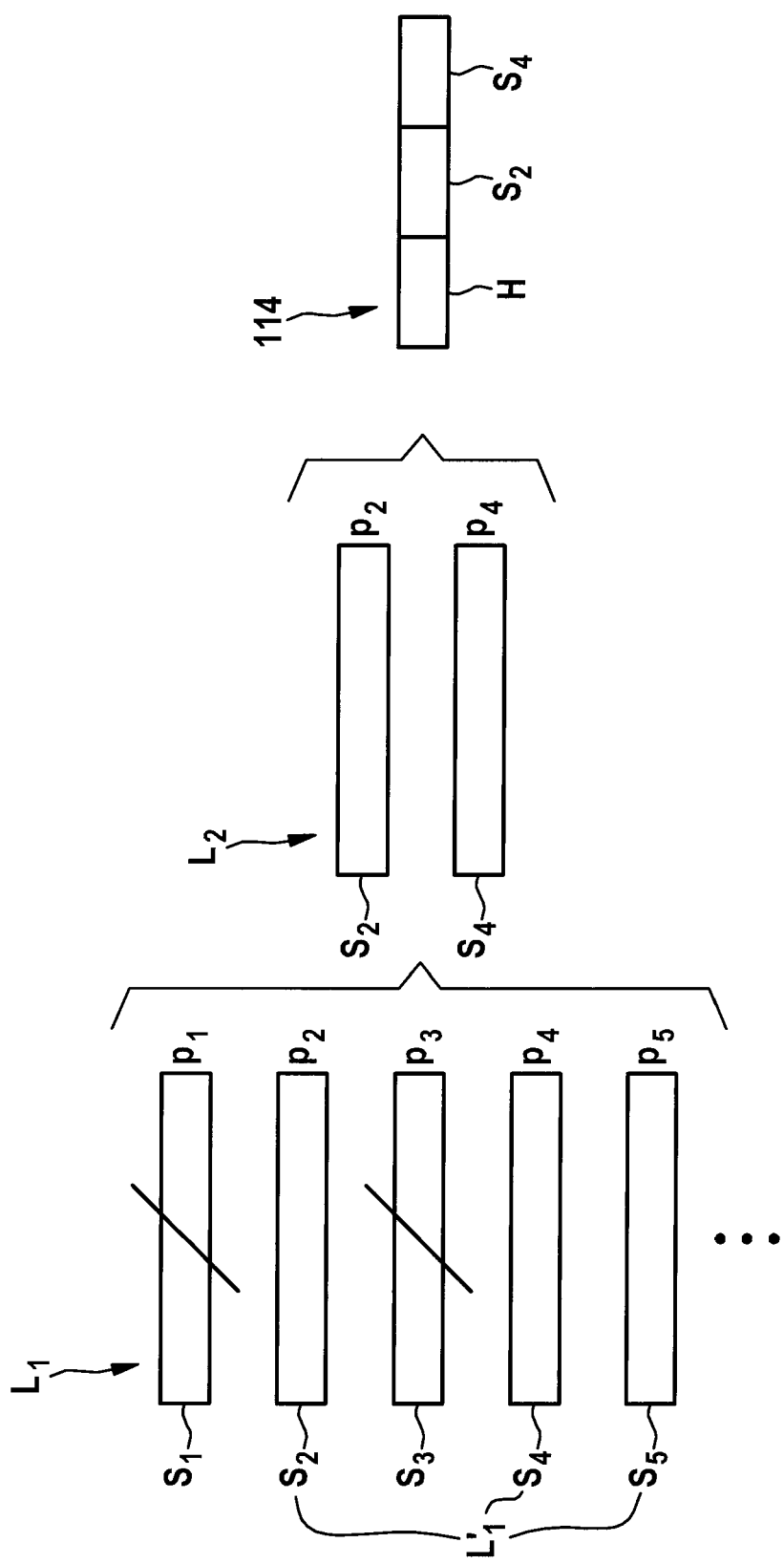
FIG. 2 schematically shows how message segments are filtered by the evaluation unit according to FIG. 1.

FIG. 2 shows a filter list $L_1$ generated by evaluation unit 108, based on sensor data 110, including different message segments $S_1$, $S_2$, $S_3$, $S_4$, $S_5$, each of which describes a recognized object in the surroundings of vehicle 103, including, for example, vehicles 101, 102, 104. Each of message segments $S_1$, $S_2$, $S_3$, $S_4$, $S_5$ is marked with a priority value $p_i$, which indicates a particular priority of the object described in the message segment.

Based on a threshold value comparison, in a first step, evaluation unit 108 removes message segments $S_1$, $S_3$ having low priority values $p_1$ and $p_3$ from filter list $L_1$, which thereby becomes a shortened filter list $L'_1$. In a second step, evaluation unit 108 creates a transfer list $L_2$ from message segments $S_2$, $S_4$, $S_5$ contained in shortened filter list $L'_1$, which, in this case, contains message segments $S_2$, $S_4$ having particularly high priority values $p_2$ and $p_4$. Transfer list $L_2$ is created in such a way that it does not exceed a predefined maximum message size. In this example, the message size is not sufficient, for example, to add message segment $S_5$ to transfer list $L_2$ in addition to the two message segments $S_2$, $S_4$. Evaluation unit 108 determines the maximum message size, for example, from the instantaneous channel capacity utilization, as described in greater detail below, based on FIG. 3.

Finally, evaluation unit 108 generates message 114 from transfer list $L_2$. Message 114 contains not only message segments $S_2$, $S_4$ to be transferred from transfer list $L_2$ but also a header H including obligatory data about vehicle 103 and its sensor system 106, among others.

Figure 3:
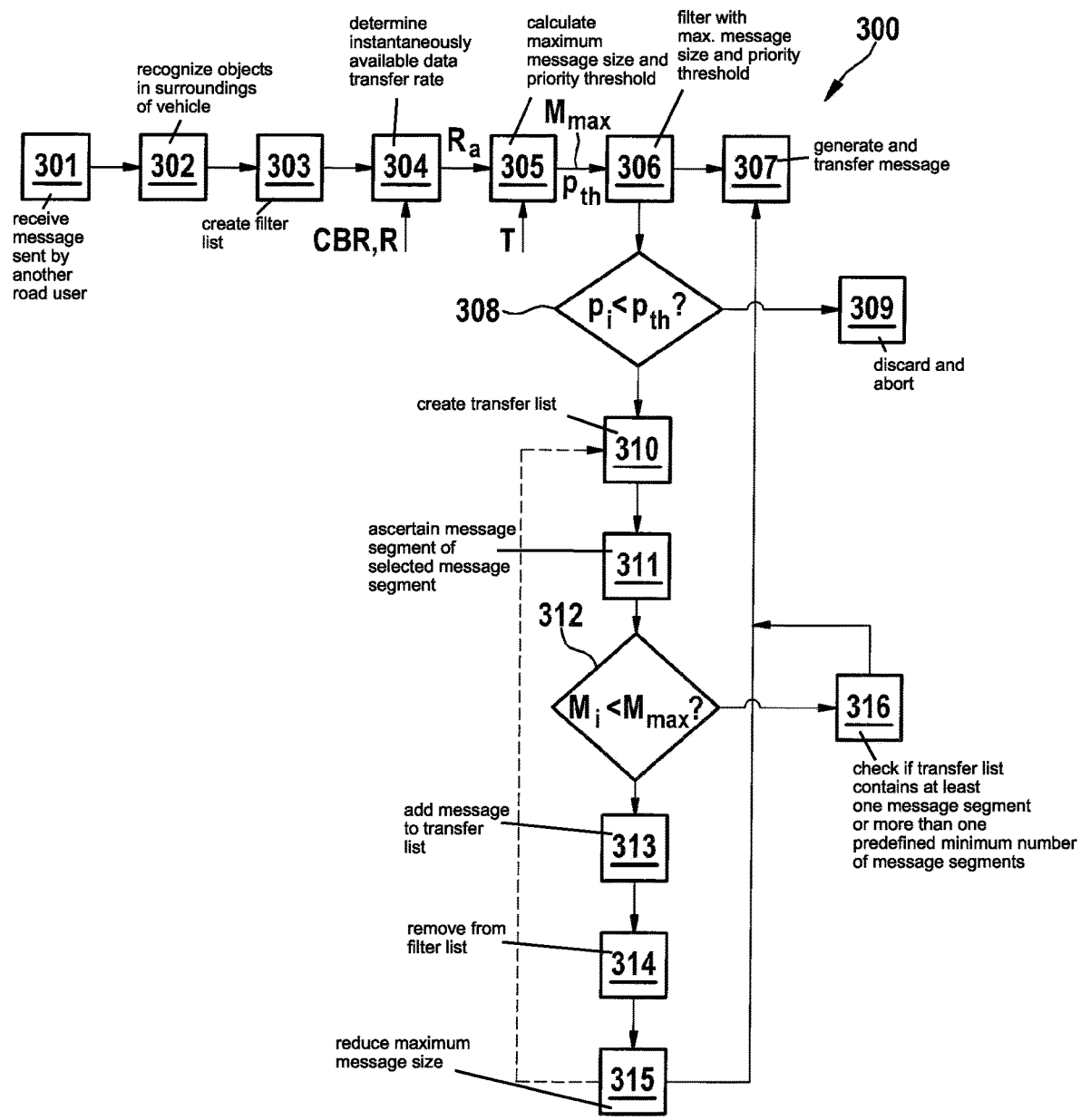
FIG. 3 shows a flowchart of a method according to one exemplary embodiment of the present invention.

FIG. 3 shows a flowchart of a method 300 for transferring message 114. Method 300 may be carried out, for example, by evaluation unit 108 according to FIG. 2.

In a first step 301, a message sent by another road user 101, 102, 104 is received in evaluation unit 108, the message containing message segments $S_1$ through $S_5$ to be filtered, which have priority values $p_1$ through $p_5$.

In a further step 303, filter list $L_1$ is created, which includes message segments $S_1$ through $S_5$ having associated priority values $p_1$ through $p_5$.

Alternatively sensor data 110 are optionally received in evaluation unit 108 in first step 301. In a further optional step 302, objects 101, 102, 104 are recognized in the surroundings of vehicle 103 by a corresponding processing and evaluation of sensor data 110. Different priority values $p_i$ are assigned to objects 101, 102, 104, depending on their relevance. In step 303, filter list $L_1$ is created, which includes message segments $S_1$ through $S_5$ to be filtered, which have associated priority values $p_1$ through $p_5$ and describe objects 101, 102, 104.

An instantaneously available data transfer rate $R_a$ of a radio channel assigned to the communications network is determined in a further step 304.

In a further step 305, a maximum message size $M_{max}$ of a message to be transferred and a priority threshold value $p_{th}$ are calculated from instantaneously available data transfer rate $R_a$.

In a further step 306, filter list $L_1$ is filtered with maximum message size $M_{max}$ and priority threshold value $p_{th}$ as filter criteria. Message segments $S_1$, $S_3$ including priority values $p_1$ and $p_3$ below priority threshold value $p_{th}$ are removed from filter list $L_1$. Message segments are selected from message segments $S_2$, $S_4$, $S_5$ including priority values $p_2$, $p_4$ and $p_5$ above priority threshold value $p_{th}$ for priority list $L_2$ until maximum message size $M_{max}$ is reached. This is the case here after message segments $S_2$, $S_4$ have been added to transfer list $L_2$.

Finally, in a step 307, message 114 is generated from transfer list $L_2$ and transferred via the radio channel in the communications network.

Method 300 described above may be viewed as an extension of an ETSI DCC protocol mentioned further above. Filter list $L_1$ may be provided, for example, by an application layer and received by an underlying layer, for example a DCC protocol. Upon the receipt of filter list $L_1$, for example the following six principle steps may be carried out by the DCC protocol. However, it is also possible that only the first two of the six steps are carried out by the DCC protocol, while the remaining steps are carried out by the application layer. In this way, it is possible to avoid lists of message segments being exchanged between the application layer and the DCC protocol.

1. A data transfer rate $R_a$ instantaneously available for a transfer is first estimated in step 304. For example, an instantaneous channel busy ratio CBR may be measured for this purpose. Channel busy ratio CBR describes a time portion, in which the radio channel is used by other stations ($0 \leq CBR \leq 1$). Based on measured channel busy ratio CBR and an available data rate R of the radio channel, which may be advantageously estimated from a total data rate, and may be, for example, two-thirds of the total data rate, available throughput $R_a$ is calculated to:

$$R_a = (1-CBR) \cdot R \text{ [Mbit/s]}$$

2. Based on available throughput $R_a$ and a time T which has elapsed since a last message transfer, in step 305 maximum message size $M_{max}$ is calculated to:

$$M_{max} = R_a \cdot T \text{ [bit]}$$

3. In Step 305, priority threshold value $p_{th}$ is furthermore calculated as a function of channel busy ratio CBR, a higher channel busy ratio CBR resulting in a higher priority threshold value $p_{th}$ and vice versa. Alternatively or additionally, priority threshold value $p_{th}$ may be ultimately calculated, based on a statistical distribution of priority values $p_i$, for a transfer of selected message segments $S_i$, for example based on an arithmetic mean value or a median. Priority threshold value $p_{th}$ is greater, the greater are priority values $p_1$ of message segments $S_i$ last selected, and vice versa.

4. In a step 308, all message segments $S_1$, $S_3$ are now discarded from filter list $L_1$, whose priority value $p_1$ or $p_3$ is below priority threshold value $p_{th}$. Filter list $L_1$ is shortened accordingly thereby. If, at the outset, filter list $L_1$ contains only message segments $S_i$ including priority values $p_1$ below priority threshold value $p_{th}$, entire filter list $L_1$, for example, is discarded, and the method is aborted in a step 309.

5. In a step 310, transfer list $L_2$ is created as a new empty list. Message segments for transfer list $L_2$ are now selected from message segments $S_2$, $S_4$, $S_5$ of shortened filter list $L'_1$.

6. For this purpose, filter list $L_1$ is processed step by step. Message segment $S_2$ including highest priority value $p_2$ is first selected in step 310. A message segment size M of selected message segment $S_2$ is ascertained in a step 311. Message segment size M is compared with maximum message size $M_{max}$ in a step 312.

If $M < M_{max}$, selected message segment $S_2$ is added to transfer list $L_2$ in a step 313 and removed from filter list $L'_1$ in a step 314. Finally, maximum message size $M_{max}$ is reduced for a following iteration in a step 315: $M_{max,new} = M_{max} - M$.

In the next iteration, steps 310 through 315 are repeated for message segments $S_4$, $S_5$ remaining in filter list $L'_1$. The message segment including the highest priority value is now message segment $S_4$.

Steps 310 through 315 are generally repeated cyclically until filter list $L'_1$ is empty. With the aid of completed transfer list $L_2$, message 114 is finally generated and sent in step 307.

However, if it turns out in step 312 that a message segment $S_i$ to be added to transfer list $L_2$ is greater or equal to maximum message size $M_{max}$, as in the case here of message segment $S_5$, for example, it may be checked, for example, in an additional step 316 before generating message 114 whether transfer list $L_2$ contains at least one message segment $S_i$ or more than one predefined minimum number of message segments $S_i$. If this is the case, message 114 is generated and sent in step 307. If it is not the case, no message 114 is generated, and method 300 is aborted.

Finally, it should be noted that terms such as "having," "including," etc. do not exclude other elements or steps, and terms such as "a" or "one" do not exclude a plurality.

What is claimed is:

1. A method for message transfers in a communications network for communication between a road user and at least one further road user, the road user and the further road user each including an evaluation unit, the method comprising the following steps:
   receiving a first message in the evaluation unit of the road user, the first message including a plurality of message segments that each is assigned a respective priority value;
   determining an instantaneous capacity utilization of the communications network;
   determining a priority threshold value as a function of (a) the instantaneous capacity utilization of the communications network and/or (b) respective priority values of previously transferred message segments;
   based at least on the priority threshold value, filtering out from the plurality of message segments of the first message a subset of the message segments that are to be transferred out of the first message, based on the priority values and the instantaneous capacity utilization of the communications network;
   generating a second message, which includes at least part of the subset of the message segments and none of the filtered out messages; and
   sending the second message via the communications network;
   wherein the method includes at least one of the following four features (I)-(IV):
   (I) (i) the method further includes determining a maximum message size as a function of an instantaneous capacity utilization of the communications network, (ii) the filtering includes comparing the respective priority value of each of the plurality of message segments to the priority threshold value, and filtering out all of the plurality of message segments whose priority value is determined by the comparison to be below the priority threshold value, so that none of the plurality of message segments whose priority value is determined by the comparison to be below the priority threshold value is included in the subset of the message segments, and (iii) the generating of the second message includes selecting from the subset of the message segments taking into account the maximum message size;
   (II) the priority threshold value is calculated from a channel busy ratio, so that the priority threshold value increases and/or decreases along with the channel busy ratio;
   (III) at least one statistical characteristic is calculated from the priority values of the previously transferred message segments, and the priority threshold value is calculated from the statistical characteristic; and
   (IV) the instantaneous capacity utilization of the communications network is calculated as $R_a = (1-CBR) *R$, $R_a$ is an instantaneously available data transfer rate of a radio channel assigned to the communications network, CBR the channel busy ratio, and R is a data transfer rate of the radio channel.

2. The method as recited in claim 1, wherein:
   the method further includes the determining of the maximum message size as the function of the instantaneous capacity utilization of the communications network;
   the filtering includes the comparing of the respective priority value of each of the plurality of message segments to the priority threshold value, and filtering out all of the plurality of message segments whose priority value is determined by the comparison to be below the priority threshold value, so that none of the plurality of message segments whose priority value is determined by the comparison to be below the priority threshold value is included in the subset of the message segments; and the generating of the second message includes the selecting from the subset of the message segments taking into account the maximum message size.

3. The method as recited in claim 2, wherein;
the filtering includes:
creating a filter list from the plurality of message segments; and
shortening the filter list by removing from the filter list all of the message segments whose priority value is determined by the comparison to be below the priority threshold value; and
the selecting of the message segments is performed by selecting from the shortened filter list, taking into account the maximum message size.

4. The method as recited in claim 3, further comprising:
selecting a message segment including a highest priority value from the shortened filter list;
ascertaining a message segment size of the selected message segment;
comparing the message segment size with the maximum message size;
when the message segment size is smaller than the maximum message size:
adding the selected message segment to a transfer list of message segments to be transferred;
removing the selected message segment from the shortened filter list; and
reducing the maximum message size by the message segment size;
wherein:
the steps of selecting the message segment including the highest priority, ascertaining, comparing, adding, removing, and reducing are repeated cyclically until the message segment size is smaller than or equal to the maximum message size, and/or all message segments have been removed from the shortened filter list; and
the second message is generated from the transfer list.

5. The method as recited in claim 4, further comprising:
checking whether the transfer list contains at least one message segment, wherein the generating of the second message is performed using the transfer list.

6. The method as recited in claim 1, wherein the priority threshold value is calculated from the channel busy ratio, so that the priority threshold value increases and/or decreases along with the channel busy ratio.

7. The method as recited in claim 1, wherein:
the instantaneous capacity utilization of the communications network is calculated as $R_a = (1-CBR)*R$;
$R_a$ is the instantaneously available data transfer rate of the radio channel assigned to the communications network;
CBR is the channel busy ratio; and
R is the data transfer rate of the radio channel.

8. The method as recited in claim 7, wherein the maximum message size ($M_{max}$) is calculated to:
$M_{max} = R_a \cdot T$, T being a time since the last transfer of a message via the radio channel.

9. The method as recited in claim 1, wherein the at least one statistical characteristic is calculated from the priority values of the previously transferred message segments, and the priority threshold value is calculated from the statistical characteristic.

10. An evaluation unit for message transfers in a communications network for communication between a road user and at least one further road user, the evaluation unit configured to:
receive a first message, the first message including a plurality of message segments that each is assigned a respective priority value;
determine an instantaneous capacity utilization of the communications network;
determine a priority threshold value as a function of (a) the instantaneous capacity utilization of the communications network and/or (b) respective priority values of previously transferred message segments;
based at least on the priority threshold value, filter out from the plurality of message segments of the first message a subset of the message segments that are to be transferred out of the first message, based on the priority values and the instantaneous capacity utilization of the communications network;
generate a second message, which includes at least part of the subset of the message segments and none of the filtered out messages; and
send the second message via the communications network;
wherein the evaluation unit includes at least one of the following four features (I)-(IV):
(I) (i) the evaluation unit is further configured to determine a maximum message size as a function of an instantaneous capacity utilization of the communications network, (ii) the filtering includes comparing the respective priority value of each of the plurality of message segments to the priority threshold value, and filtering out all of the plurality of message segments whose priority value is determined by the comparison to be below the priority threshold value, so that none of the plurality of message segments whose priority value is determined by the comparison to be below the priority threshold value is included in the subset of the message segments, and (iii) the generation of the second message includes selecting from the subset of the message segments taking into account the maximum message size;
(II) the priority threshold value is calculated from a channel busy ratio, so that the priority threshold value increases and/or decreases along with the channel busy ratio;
(III) at least one statistical characteristic is calculated from the priority values of the previously transferred message segments, and the priority threshold value is calculated from the statistical characteristic; and
(IV) the instantaneous capacity utilization of the communications network is calculated as $R_a = (1-CBR)*R$, $R_a$ is an instantaneously available data transfer rate of a radio channel assigned to the communications network, CBR the channel busy ratio, and R is a data transfer rate of the radio channel.

11. A non-transitory computer-readable medium on which is stored a computer program for message transfers in a communications network for communication between a road user and at least one further road user, the road user and the further road user each including an evaluation unit, the computer program, when executed by a processor of the evaluation unit of the road user, causing the processor to perform a method, the method comprising the following steps:

receiving a first message, the first message including a plurality of message segments that each is assigned a respective priority value;

determining an instantaneous capacity utilization of the communications network;

determining a priority threshold value as a function of (a) the instantaneous capacity utilization of the communications network and/or (b) respective priority values of previously transferred message segments;

based at least on the priority threshold value, filtering out from the plurality of message segments of the first message a subset of the message segments that are to be transferred out of the first message, based on the priority values and the instantaneous capacity utilization of the communications network;

generating a second message, which includes at least part of the subset of the message segments and none of the filtered out messages; and sending the second message via the communications network;

wherein the method includes at least one of the following four features (I)-(IV):

(I) (i) the method further includes determining a maximum message size as a function of an instantaneous capacity utilization of the communications network, (ii) the filtering includes comparing the respective priority value of each of the plurality of message segments to the priority threshold value, and filtering out all of the plurality of message segments whose priority value is determined by the comparison to be below the priority threshold value, so that none of the plurality of message segments whose priority value is determined by the comparison to be below the priority threshold value is included in the subset of the message segments, and (iii) the generating of the second message includes selecting from the subset of the message segments taking into account the maximum message size;

(II) the priority threshold value is calculated from a channel busy ratio, so that the priority threshold value increases and/or decreases along with the channel busy ratio;

(III) at least one statistical characteristic is calculated from the priority values of the previously transferred message segments, and the priority threshold value is calculated from the statistical characteristic; and (IV) the instantaneous capacity utilization of the communications network is calculated as $R_a=(1-CBR)*R$, $R_a$ is an instantaneously available data transfer rate of a radio channel assigned to the communications network, CBR the channel busy ratio, and R is a data transfer rate of the radio channel.

* * * * *